United States Patent [19]

Clapham

[11] 4,046,631

[45] Sept. 6, 1977

[54] PLUGS

[75] Inventor: Leslie Clapham, Lytham, England

[73] Assignee: United Kingdom Atomic Energy Authority, London, England

[21] Appl. No.: 396,106

[22] Filed: Sept. 10, 1973

[30] Foreign Application Priority Data

Sept. 15, 1972 United Kingdom ............... 42838/72

[51] Int. Cl.² .............................................. G21C 3/10
[52] U.S. Cl. ................................................... 176/79
[58] Field of Search ............................... 176/68, 79, 80

[56] References Cited

U.S. PATENT DOCUMENTS

| 3,466,226 | 9/1969 | Lass ..................................... | 176/68 |
| 3,762,995 | 10/1973 | Gulbransen et al. ............... | 176/68 |

FOREIGN PATENT DOCUMENTS 1,010,124  11/1965  United Kingdom ................. 176/79

Primary Examiner—Stephen C. Bentley
Attorney, Agent, or Firm—Larson, Taylor and Hinds

[57] ABSTRACT

Nuclear fuel is canned in metal cans which have sealed closures to maintain the cans leak tight. Failure of the seal due to the chemical reaction of free hydrogen within the can is a problem which is alleviated by incorporating within the can a mass of a material which will be selectively attacked by hydrogen. Zirconium alloy is such a material and in the case of fuel canned in this alloy the hydrogen trap needs special shaping and positioning to ensure that it, rather than the can wall, is preferentially attacked by any hydrogen present.

2 Claims, 2 Drawing Figures

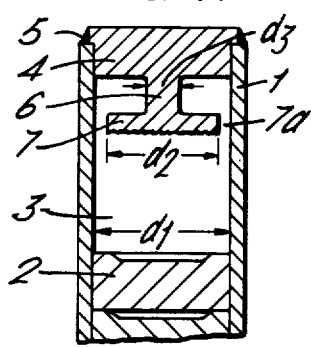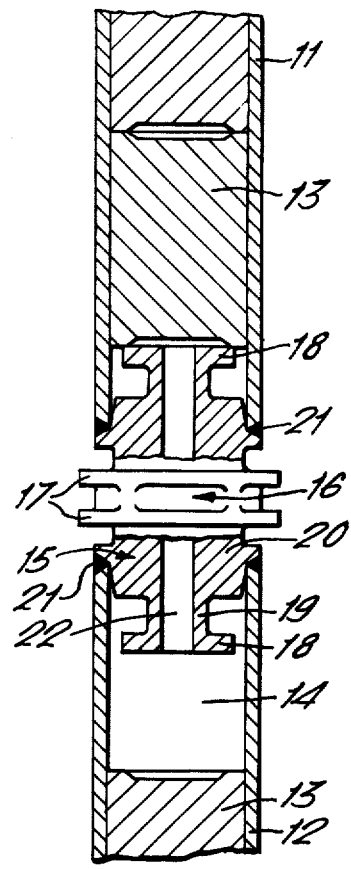

PLUGS

BACKGROUND OF THE INVENTION

This invention relates to nuclear fuel enclosed in metal cans and aims to improve the integrity of the closure of such cans.

Before a can closure is made during manufacture of canned fuel the can interior is evacuated (and may be filled with an inert gas) to remove any foreign substance which may set up, subsequently, chemical reactions which deleterious effect the integrity of the can as a container of nuclear fuel. In spite of these precautions, which are a routine step in canned nuclear fuel manufacture, it is difficult to ensure that the removal of foreign substances has been absolute because some gases or vapours, especially water vapour remains absorbed in solid surfaces within the can. The inventor has detected that certain failures of canned fuel can be ascribed to the chemical reactions which occur within the can between the gaseous components of these sorbed vapours, said components appearing in the free state only after the can has been subject to irradiation and high temperature in a nuclear reactor. Making good the defects at this stage is a rather drastic procedure involving reactor shut down and replacement of part of its core to extracate the faulty fuel can.

Amongst metal can materials, zirconium is an excellent base for an alloy from which to make the can and its closure, on account of its low neutron absorption cross section and combined with other alloy constituents, its good high temperature performance. Zirconium base alloys, such as those sold under the trade name "Zircalloy", are prone to absorb hydrogen, and as a consequence react with that gas to form zirconium hydride.

There will almost certainly be some remnant water vapour inside a closed can, the vapour acting as a potential, subsequent source of free hydrogen. It has been found that the attack by this free hydrogen on the can closure, accompanied by the formation of the hydride, which migrates to the seal weld of the closure, results in a breach of the can integrity.

SUMMARY OF THE INVENTION

According to the invention a metal nuclear fuel can is provided with a metal closure plug for closing and open end of the can, the plug having a closure portion dimensioned to engage the open end, a stem of reduced cross-sectional area extending axially from the dimensioned portion into the can interior, the stem terminating in a flange of enlarged cross-section formed of a material which is selectively susceptible of attack by hydrogen. The dimensioned portion of the plug, stem and flange may be machined from a single billet of metal which is preferably a zirconium base alloy. Whether integral or not, the flange face which is directed towards the can interior may have a pronounced surface roughness, ie the machine tooling marks are preserved, so that it is rougher than the inside of the can wall to encourage preferential absorption of hydrogen. The proportions of these components of the plug when cylindrical are such that the flange enters the can with a small clearance and is joined to the dimensioned portion by a stem whose diameter is about half that of the flange.

Typical cross sectional area proportions be between the ranges

| can inside diameter and closure plug | | flange | | stem |
|---|---|---|---|---|
| 5.0 | : | 4.0 | : | 1.0, and |
| 8.0 | : | 6.0 | : | 1.5 |
| Preferred ratios are approximately | | | | |
| 6.8 | : | 5.0 | : | 1.2 |

In a typical case an annular gap of 0.5 mm may be left between the periphery of the flange and the can wall.

The plug, stem and flange may be two or more separate pieces joined into a unit.

Preferably the flange is made of zirconium or zirconium alloy with its face adjacent the fuel filling of the can roughened to increase its susceptability to attack by hydrogen. This flange, being the hottest part of the plug, as it is nearest the fuel, is one in which hydrides are preferentially formed. As the hydride builds up and reaches a certain concentration, it migrates along grain boundaries into the flange due to the falling temperature gradient extending from the hot face of the flanges towards the cooler face and the adjacent stem. The small cross-section of the stem forms an impedence to the heat conduction path and the hydride migration path and hence restricts, respectively, the formation of hydride at the plug region adjacent the seal weld and the transfer of the hydride formed in hotter regions of the flange into the weld.

The integrity of the fuel can is thus enhanced as the weld does not suffer hydride attack. In functional terms, the proportions are such as to ensure that the flange presents a large enough surface area to the can interior so as to be likely to take up the major proportion of any hydrogen appearing in the fuel containing space, by the need to ensure that the stem has a cross-sectional area sufficient to support the flange (naturally) and to provide an impedence both to heat conduction from the flange and to diffusion of hydride salts from the flange in both cases to the plug, and via the plug to the weld between can and plug.

In a modification, the closure plug may be double ended so as to interconnect two co-axial metal cans, each plug end having a stem and terminal flange susceptible of hydrogen attack.

DESCRIPTION OF THE DRAWINGS

In order that the invention may be better understood, embodiments thereof will now be described with reference to the accompanying drawings in which FIG. 1 is an axial cross section through part cylindrical fuel can, only one end, having a closure plug, is shown, and FIG. 2 is an axial cross section through a double ended plug joining two similar fuel cans, end to end.

DESCRIPTION OF THE PREFERRED EMBODIMENTS

Referring firstly to FIG. 1 a nuclear fuel can comprises a circular section tube 1 of a zirconium base alloy and contains pellets 2 of nuclear fuel such as uranium dioxide powder. The pellets do not fill the whole interior of the can and a space 3 is left at one end. The end of the can is closed by a plug 4 and sealed by a peripheral weld 5. Resilient means, not shown, are provided for holding the pellets in position.

Protruding from the plug 4 is a stem 6 of reduced diameter carrying at its free end a flange 7 of a zirconium alloy which is readily attacked by hydrogen. As shown the plug 4, stem 6 and flange 7 are integral having been machined from a single billet. The flange 7 is left in a rough machined condition whilst the faces of the plug which meets with the can wall are given a smooth finish free from tool marks.

For a can internal diameter $d_1$ of 13.6 mm the flange diameter $d_2$ is made 10 mm whilst the stem diameter $d_3$ in made 2.4 mm.

In operation, any hydrogen which disassociates from water desorbed from the fuel pellets accumulates in the space 3 and being a light element rises to the top where it is confronted by the hot face of the flange 7, surrounded by a narrow annular gap 7a between the flange periphery and can wall.

Hence probability that hydrogen will be absorbed by the rough surface of the flange ie its hottest region is very high and little if any hydrogen will traverse the gap 7a. The hydrogen, once it has been adsorbed, reacts with the zirconium in the flange 7 to form a zirconium hydride which, so long as there is a temperature gradient, ie falling from the flange face towards the stem 6, will diffuse along grain boundaries into the stem 6. In this cooler region the salts tend to precipitate at the stem surface. This action avoids migration of the hydrides from the stem into the plug closure and thence into the seal welds 5 which would then be weakened and become very susceptible to fracture. Other deleterious effects attributable to the presence of free hydrogen in the fuel can are also avoided.

The plug described may be employed in either end of a fuel can and if desired the fuel pellets may almost abut the end face of the flange 6, care being taken to dish one or both of the adjacent surfaces so as to present the maximum surface area to contaminated gases.

FIG. 2 shows a double ended plug for connecting together two fuel cans 11, 12 end to end and at the same time intercommunicating the interior spaces of the two cans.

In detail, each can 11, 12 contains super-imposed nuclear fuel pellets 13, the length of the cans exceeding the length of the fuel charge such that a space 14 appears above the top fuel pellet in the lower can 12. The connecting plug 15 comprises in effect two plugs, as shown in FIG. 1 joined back to back with a bridge piece 16. The latter has a pair of spaced flanges 17 which project peripherally proud of the can wall; in order to space the fuel can peripherally from the channel wall in which it is situated, or from adjacent fuel cans. The double ended plug is machined from a single billet of zirconium alloy and each has a terminal flange 18, stem 19, and plug closure portion 20 proportioned similarly to the single plug in FIG. 1. The whole billet is drilled through with a hole 22 to allow the can interiors to inter-communicate.

The performance of the plugs in FIG. 2 is similar to that in FIG. 1, that is to say defensive against a typical hydride attack which may go through the following stages.

a. hydrogen, from desorbed water in the fuel under operational conditions, appears in the can and is confronted by a very hot end face of a flange 7 (18);

b. a layer of zirconium hydride is formed on the end face of the flange as the latter adsorbs hydrogen;

c. eventually a diffusion mechanism begins to transfer the hydride from the hot end face to the cooler regions of the plug, i.e. the face of the flange remote from the end face and the stem. Ultimately the hydride level at the outside surface of the flange greater than at the end face. It should be mentioned that the same reactions will be occurring simultaneously at the surface of the can wall if it be made of zirconium alloy but the migration along the can wall will be at a very slow rate since the temperature gradient is small along this component compared with the falling temperature gradient along the plug from flange to closure portion via the stem.

Finally zirconium hydride precipitates in the surface of the cooler regions of the stem and this provides a good defence against contamination of the seal weld by hydrides and the seal weld is the ultimate barrier to leakage.

I claim:

1. A metal nuclear fuel can having a metal closure plug for closing an open end of the can, the plug having, a closure portion dimensioned to engage the open end, a team of reduced cross-sectional area extending axially from the dimensioned portion into the can interior, the stem terminating in a flange of enlarged cross-sectional are, the flange being formed of a material which is selectively susceptible of attack by hydrogen, the surface of the flange remote from the closure portion having a surface roughness greater than that of the interior surface of the can wall.

2. A metal nuclear fuel can as claimed in claim 1 in which the said surface of the flange has a series of annular grooves formed in its surface.

* * * * *